(12) United States Patent
Hohil et al.

(10) Patent No.: US 7,409,374 B1
(45) Date of Patent: Aug. 5, 2008

(54) EXPLOSIVE EVENT DISCRIMINATION METHOD

(75) Inventors: Myron Hohil, Parsippany, NJ (US); Sashi V. Desai, Franklin, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 164 days.

(21) Appl. No.: 11/161,903

(22) Filed: Aug. 22, 2005

Related U.S. Application Data

(60) Provisional application No. 60/593,063, filed on Dec. 6, 2004.

(51) Int. Cl.
*G06F 15/18* (2006.01)
*G06G 7/02* (2006.01)

(52) U.S. Cl. .............................. 706/20; 706/15; 706/31

(58) Field of Classification Search .................. 706/20, 706/15, 31; 102/293
See application file for complete search history.

(56) References Cited

U.S. PATENT DOCUMENTS 7,233,936 B1 * 6/2007 Muller et al. ................. 706/52

OTHER PUBLICATIONS

Reiff et al., Chris, "Discrimination of Chemical/Biological versus High-Explosive Artillery Rounds using Acoustic and Seismic Data Fusion", SPIE, vol. 5099, Apr. 2003.*
Fargues et al., Monique, "Chemical/Biological Round Discrimination Using Acoustic, Seismic, and Imaging Data", IEEE, 2003.*
Sickenberger et al., David, "Use of Disparate Sensors for the Detection of Chemical and Biological Events", SPIE, vol. 4743, Aug. 2002.*
Karayiannis et al., Nicolaos, "Fuzzy Pattern Classification Using Feed-forward Neural Networks with Multilevel Hidden Neurons", IEEE, 1994.*
Nelson et al., Bruce, "Automated Development of Linguistic-Fuzzy Classifier Membership Functions and Weights For Use In Disparate Sensor Integration Visible and Infrared Imaging Sensor Classification", SPIE, Apr. 2004.*
Mays, Brian, "Shockwave and Muzzle Blast Classification via Joint Frequency and Wavelet Analysis", US Army Research Labaoratory, 2001.*
Mays, Brian, "Shockwave and Muzzle Blast Classification via Joint Time Frequency and Wavelet Analysis", 2001.*
Nelson et al., Bruce, "Automated Development of Linguistic-Fuzzy Classifier Membership Functions and Weights for Use in Disparate Sensor Integration Visible and Infrared Imaging Sensor Classification", 2004.*

* cited by examiner

*Primary Examiner*—David Vincent
*Assistant Examiner*—Adrian L Kennedy
(74) *Attorney, Agent, or Firm*—John F. Moran

(57) ABSTRACT

A method for discriminating between explosive events having their origins in High Explosive or Chemical/Biological detonation employing multiresolution analysis provided by a discrete wavelet transform. Original signatures of explosive events are broken down into subband components thereby removing higher frequency noise features and creating two sets of coefficients at varying levels of decomposition. These coefficients are obtained each time the signal is passed through a lowpass and highpass filter bank whose impulse response is derived from Daubechies db5 wavelet. Distinct features are obtained through the process of isolating the details of the high oscillatory components of the signature. The ratio of energy contained within the details at varying levels of decomposition is sufficient to discriminate between explosive events such as High Explosive and Chemical/Biological.

9 Claims, 24 Drawing Sheets

Train Classifier
(e.g. Neural Network)

Discriminating Events

EXPLOSIVE EVENT DISCRIMINATION METHOD

CROSS REFERENCE TO RELATED APPLICATIONS

This application claims benefit under 35 USC 199(e) of provisional application 60/593,063, filed Dec. 6, 2004, the entire file wrapper contents of which provisional application are herein incorporated by reference as though fully set forth at length.

FIELD OF THE INVENTION

This invention pertains generally to the detection and discrimination of explosive events. More particularly, it pertains to a method that uses acoustic sensors for discriminating between high-charge explosions and explosions from systems potentially deploying chemical and/or biological systems.

BACKGROUND OF THE INVENTION

Currently employed chemical and biological detection systems rely upon direct contact with lethal chemical/biological agents in order to warn of the existence of such agents. Examples of these systems include detection mechanisms that incorporate chemically reactive materials that change color upon contact with a chemical agent.

Unfortunately, such chemically reactive systems are typically ineffective at detecting biological materials. And since they are only effective when in an already contaminated area, the do not provide any early warning to first responders or troops.

SUMMARY OF THE INVENTION

In recognition of the substantial deficiencies in the art and the urgent needs of contemporary society, we have developed a method for discriminating between explosive events that result from high-charge explosions and those explosions which may potentially distribute chemical/biological agents.

In operation, our inventive method employs an acoustic sensor used in conjunction with a novel algorithm to detect an airburst or other explosive event and subsequently determine whether that explosive event was a high explosive, or chemical/biological blast. Advantageously, our method and related algorithm are highly reliable, and permit sensor placement geographically remote from the explosive event and therefore out of harms way. Consequently, our inventive method and algorithm permit—for the first time—an early warning of explosively deployed, incoming chemical/biological agents.

According to our invention, a discrete wavelet transform is used to extract predominant components of particular characteristics of explosive events. Highly reliable discrimination is achieved with a feedforward neural network classifier trained on a feature space derived from the distribution of wavelet coefficients and higher frequency details found within different levels of the multiresolution analysis.

DESCRIPTION OF THE DRAWING

FIG. 1($b$) is a graph depicting acoustic signatures of a Simulated CB blast;

FIG. 1($c$) is a graph depicting an air burst for base injection round;

FIG. 2($b$) is a graph of the translation function for a Daubechies wavelet having n=5;

DETAILED DESCRIPTION

Figure 1A:
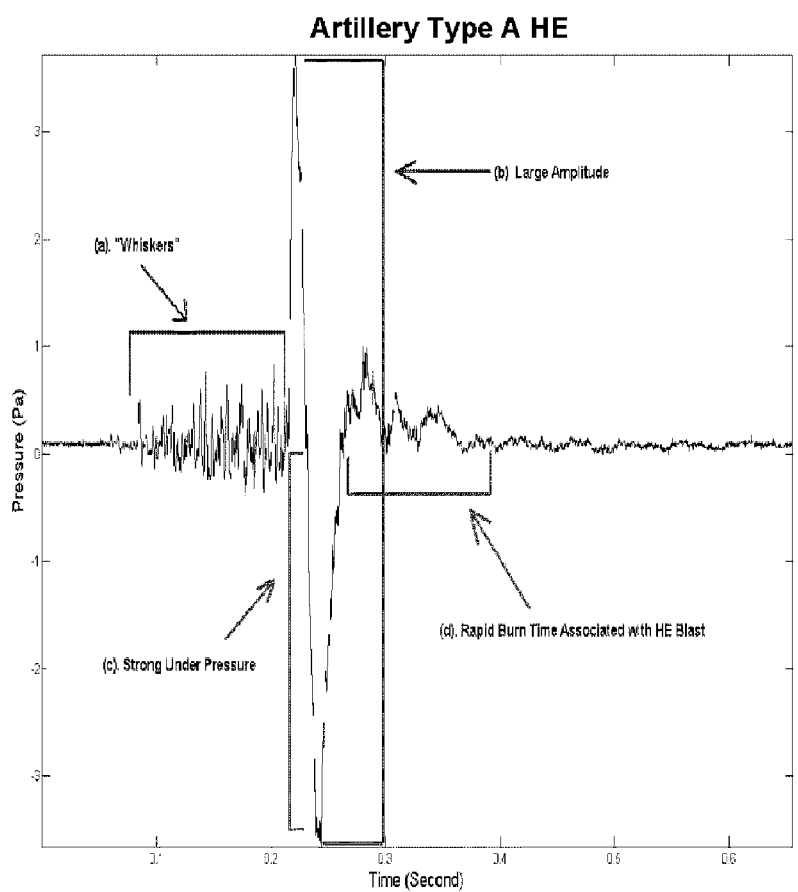
FIG. 1($a$) is a graph depicting acoustic signatures of a HE blast.
Figure 1B:
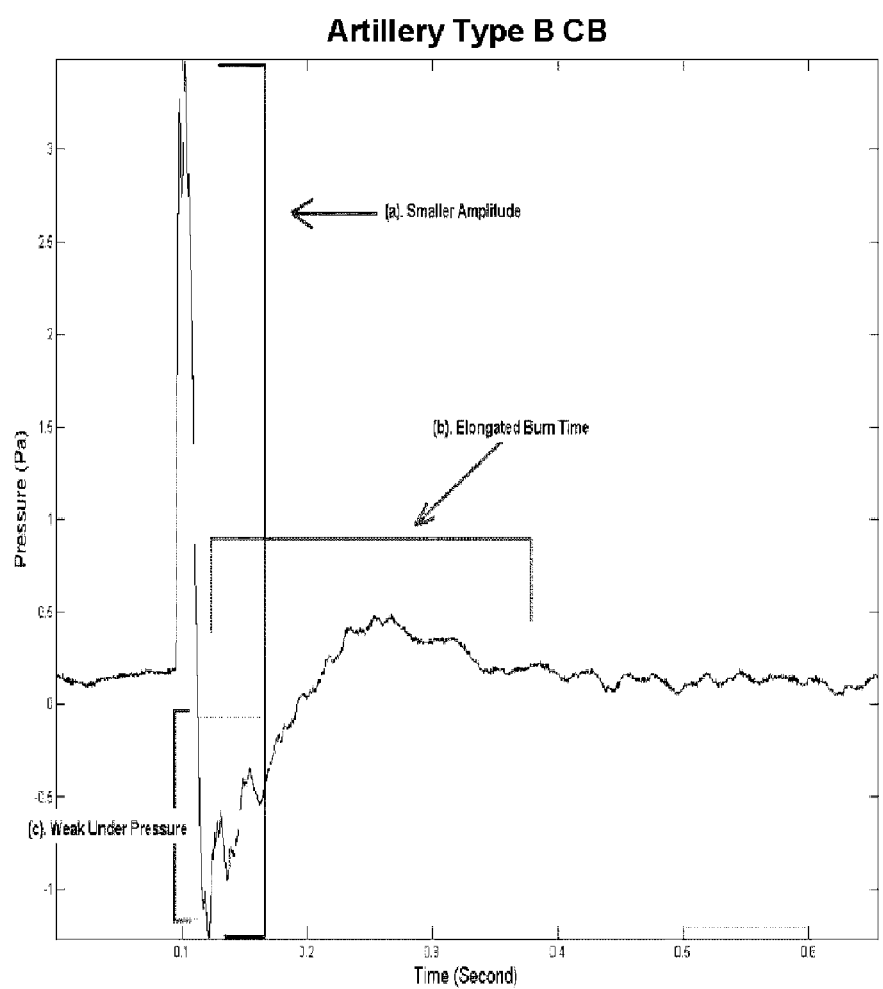
Figure 1C:
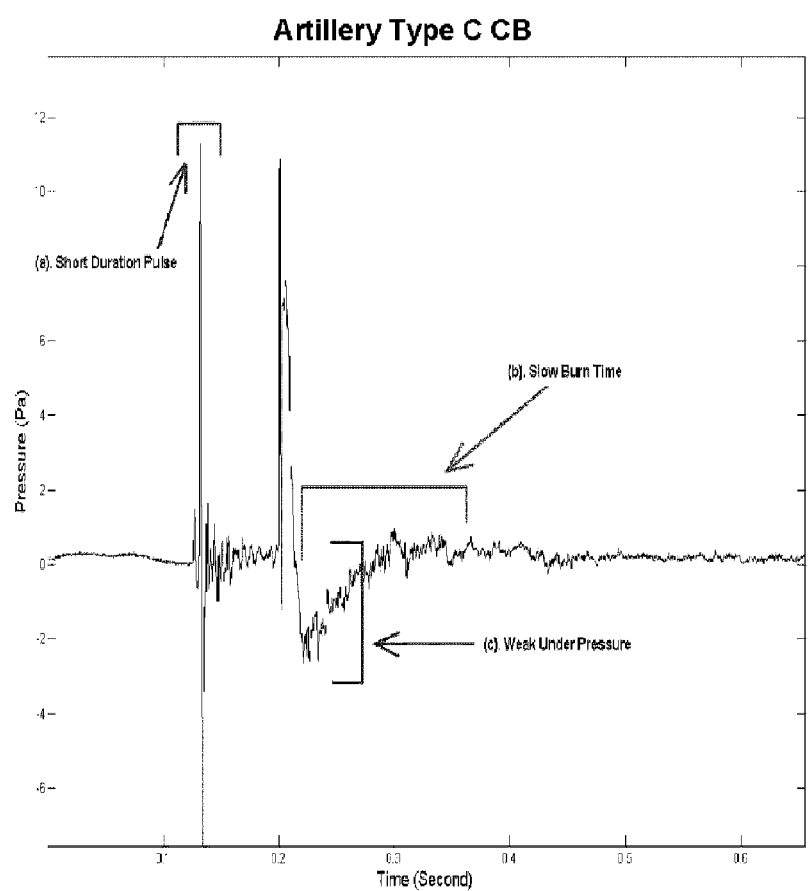

In implementing our inventive method and algorithm, we make use of wavelet analysis to identify distinct, disjoint feature sets that remain consistent for a given class of explosive event, and do not degrade dramatically with long-range propagation. With initial reference to FIG. 1 there is shown three representative acoustic signatures which are complex, non-stationary signatures that are categorically poor candidates for prior-art methods that employ feature extraction and segmentation via Fourier analysis or the short-time Fourier Transform.

In particular, and with reference to FIG. 1($a$), there is shown a signature of a typical blast of a HE round. As can be observed from this FIG. 1($a$), such a blast includes high frequency precursors to the main blast—typically generated by supersonic shrapnel elements. The main blast, exhibits a large amplitude along with a strong under-pressure element generated by a large quantity of explosive rapidly burning. Such blast signatures are typically very short duration.

FIG. 1($b$), on the other hand, shows a signature of a simulated CB blast. In contrast to the HE signature of FIG. 1($a$), the CB signature of FIG. 1($b$) exhibits a small amplitude associated with the blast, an elongated burn time following the main blast and a relatively weak under-pressure component(s). As can be appreciated, the elongated burn time following the main blast is deliberately slow, such that proper release of the chemical/biological agents occurs.

Finally, FIG. 1($c$) shows a typical blast signature of a round which is characterized by a short duration pulse (resulting from base ejection rounds), a weak under pressure (resulting from a relatively small amount of explosive), and a slow burn time—perhaps to properly discharge any chemical/biological contents of the round.

In sharp contrast, and as we shall show, these non-stationary, transient and often oscillatory signals are efficiently represented according to our inventive teachings with wavelet bases that effectively capture the time-frequency distribution of such signal components. Toward this end, our inventive method employing wavelet transforms provides a scalable time-frequency representation of explosive blast signatures and uncovers details that are not readily found using conventional signal processing techniques.

As can now be appreciated, the wavelet analysis which will serve as the basis of our inventive method permits the efficient representation of non-stationary, transient and oscillatory signals. In addition, it exhibits desirable localization properties in both time and frequency that has appropriate decay in both properties. Finally, and particularly relevant to the instant invention, it provides a scalable time-frequency representation of a representative explosive event, for example, an artillery blast signature.

Importantly, our inventive method employing wavelet multiresolution analysis permits the isolation of noise and its removal from a baseband signal of interest—a process referred to as wavelet denoising. This wavelet denoising aspect of our inventive method attempts to remove noise components from signal components regardless of the frequency content of the signal, which turns out to be far more efficient that conventional filtering methods that retain baseband signal components and suppress high frequency noise.

Discrete Wavelet Transform and Multiresolutional Analysis

By way of some additional background, the Discrete Wavelet Transform (DWT) is derived from subband filters and is based on a multiresolution decomposition of a signal to give a coarser and coarser approximation to an original signal by removing high frequency detail at each level of decomposition. In other words, the wavelet transform is a multiresolution transform that maps low frequency information of signals into a coarsely sampled subspace and maps high frequency information into more finely sampled spaces. The DWT is defined by a scaling function:

$$\phi(x) = 2^{\frac{1}{2}} \sum_{k=0}^{L-1} h_{k+1} \phi(2x - k) \quad (1)$$

and a wavelet function:

$$\psi(x) = 2^{\frac{1}{2}} \sum_{k=0}^{L-1} g_{k+1} \phi(2x - k) \quad (2)$$

where $h_k$ and $g_k$ are analysis filters. As can be readily appreciated by those skilled in the art, choosing an appropriate wavelet filter is important in retaining the characteristics of the transient signals in question.

The quality of the wavelet decomposition depends largely on the ability to approximate the signal with wavelets, so the choice of the wavelet scaling function should have properties similar to the original signal. The output of the wavelet transform shows the correlation between the signal and the wavelet as a function of time.

Probably the easiest method for choosing a wavelet is to simply copy a signal's time-frequency behavior. Unfortunately however, most transient signals cannot be used as wavelet basis functions since they resemble exponentially damped sinusoids and do not possess a zero mean.

Figure 2:
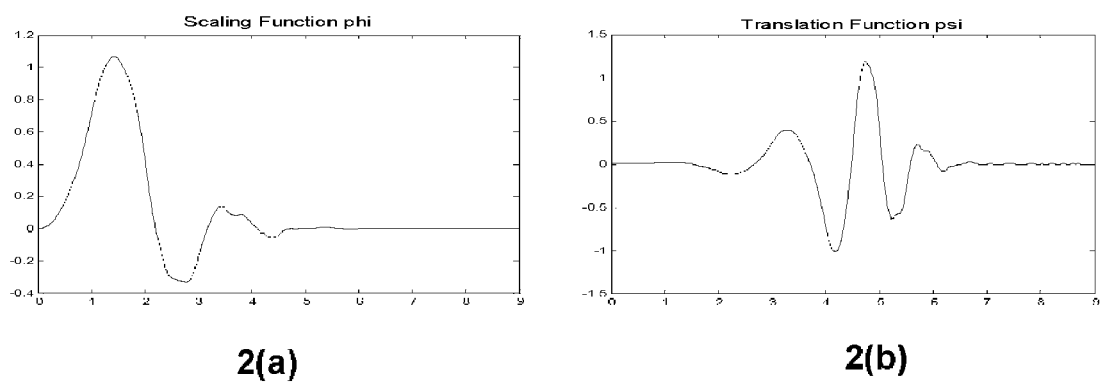
FIG. 2($a$) is a graph of the scaling function for a Daubechies wavelet having n=5.

Accordingly, the wavelet basis we preferably use herein is a known, db5 wavelet defined by Daubechies that has the scaling function and translation function shown graphically in FIG. 2(a) and FIG. 2(b), respectively. Note further that the scaling function resembles the blast signature(s) for the waves shown in FIG. 1(a) and FIG. 1(b), as well as the short pulse preceding the main blast in FIG. 1(c).

Figure 3:
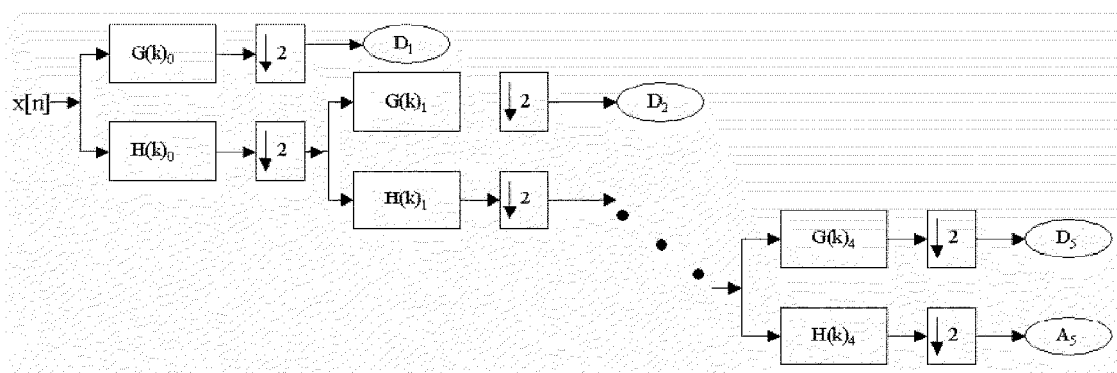
FIG. 3 is a schematic of a multirate filter bank used as a five-level wavelet decomposition tree.

With reference now to FIG. 3, there is shown a schematic of a multiresolution filter bank used to implement the DWT using low pass and high pass wavelet filters to decompose an input signal into different frequency bands. At each level of decomposition, the high pass filter defined in Equation (2) produces detail information, $D_n$, while the low pass filter associated with the scaling function in Equation (1) produces coarse approximations, $A_n$.

The process of successive low pass and high pass filtering of an input signal to implement the DWT is oftentimes referred to as the Mallat algorithm. The resulting banks of dyadic multirate filters are used to split up the input signal's frequency components into different subbands at each decomposition level, each with a subset of frequencies spanning half of the original frequency band. If the original signal is sampled at a frequency of fs Hz, then the output of the first high pass filter which is the first detail coefficient $D_1$, captures the band of frequencies between fs/2 and fs/4. This doubles the frequency resolution as the uncertainty in frequency is reduced by a factor of 2.

In the same fashion, the high pass filter in the second stage captures signal components with a bandwidth between fs/4 and fs/8, and so on. In this way, an arbitrary frequency resolution is obtained. Since the input signal at each stage of decomposition contains the highest frequency equivalent to twice that of the output stages, it can be sampled at half the original sampling frequency, thus discarding half of the samples with no loss of information. Advantageously, this decimatation by 2 halves the time resolution of the entire signal as the input signal is represented by half of the total number of samples and effectively doubles the scale.

Figure 4A:
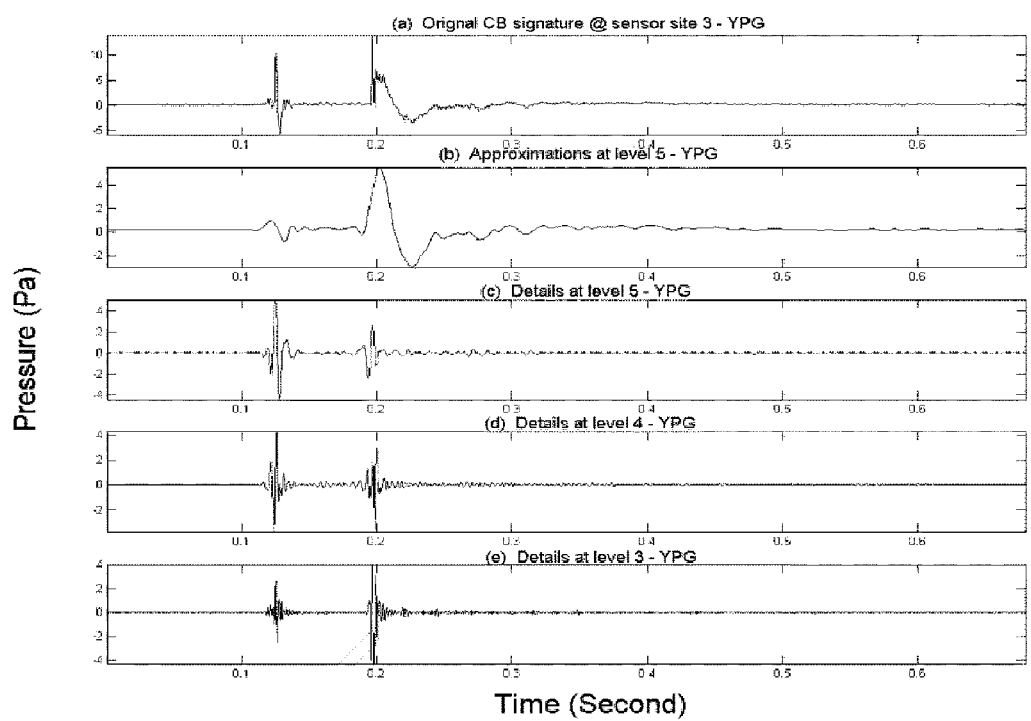
FIG. 4($a$-$c$) are graphs showing blast waves from three distinct artillery rounds of interest followed by four signals derived from the multiresolution analysis of FIG. 4.
Figure 4B:
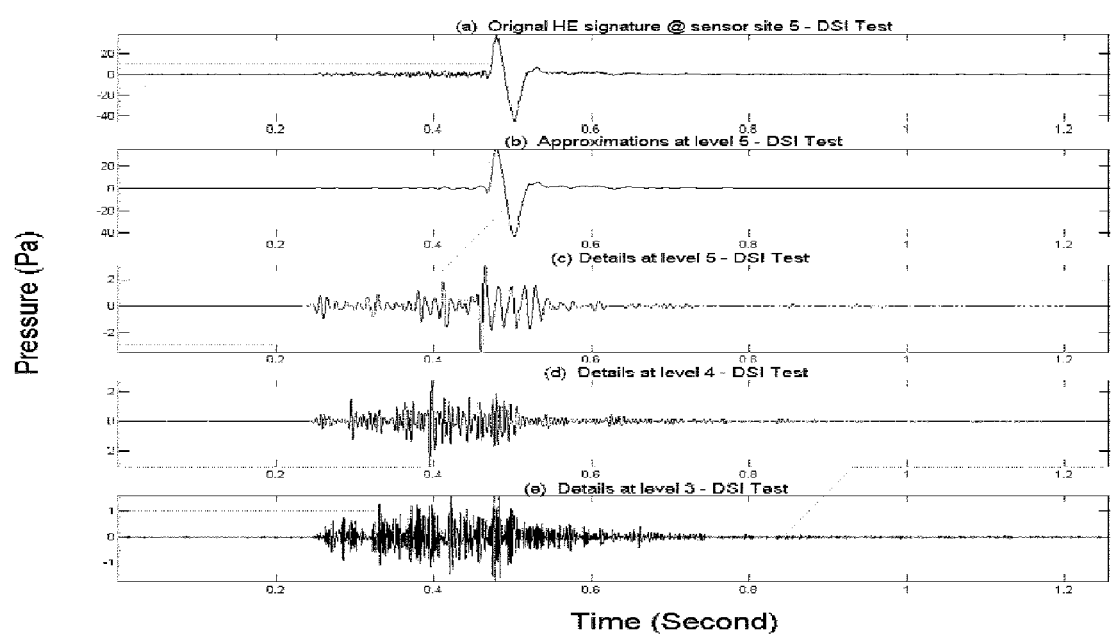
Figure 4C:
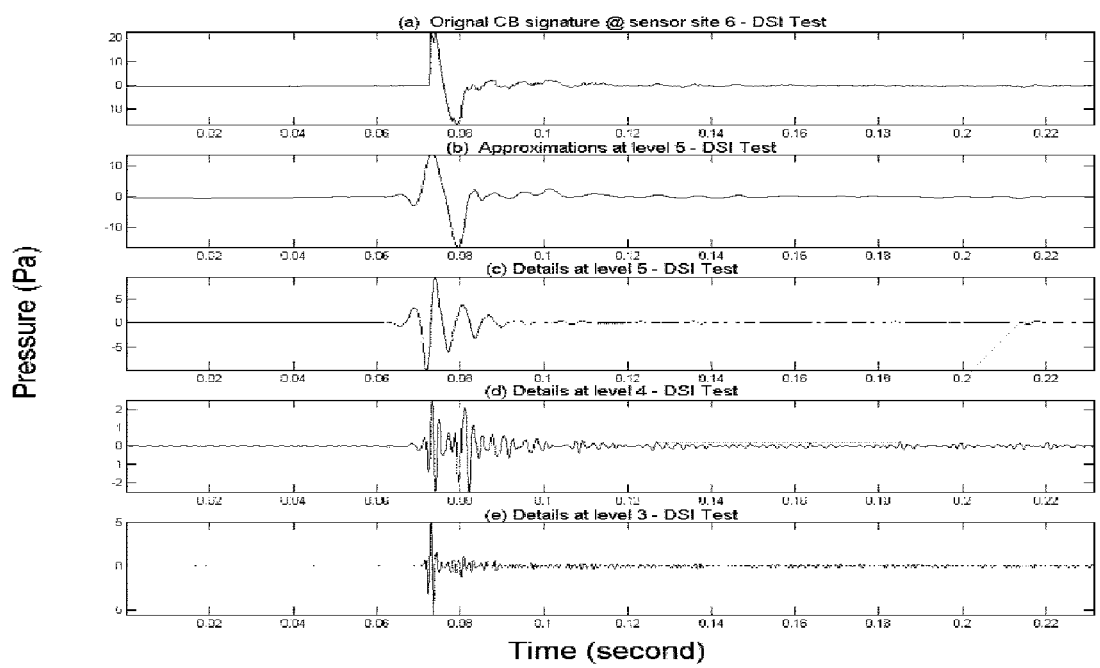

Turning now to FIG. 4(a)-FIG. 4(c), there are shown blast waves from three distinct rounds of interest, followed by four signals derived from the multiresolutional analysis shown in FIG. 3, the coefficients at level 5 and detail signals at levels, 5, 4, and 3 respectively. The feature space is comprised of primitives derived from the normalized energy distributions within the details at level 5, 4, and 3, centered about the maximum value of the blast wave. In addition, a fourth feature is obtained from values derived from the coefficients at level 5.

Features such as the rise time for the blast wave and the low frequency content found within the acoustic signals is least attenuated over long propagation distances when compared to some of the predominant features initially identified for discrimination. From the signal plots of FIGS. 4(a), 4(b), and 4(c), it can be seen that at varying levels of decomposition beyond level 2, differences in the energy distributions within the details differ dramatically prior to the max peak pressure of each blast with respect to energy distributions after the blast has occurred. Furthermore, this energy is not amplitude dependent as the baseband signal is filtered by the scaling function and only the high-frequency noise components are captured within the details after decomposition.

Figure 5A:
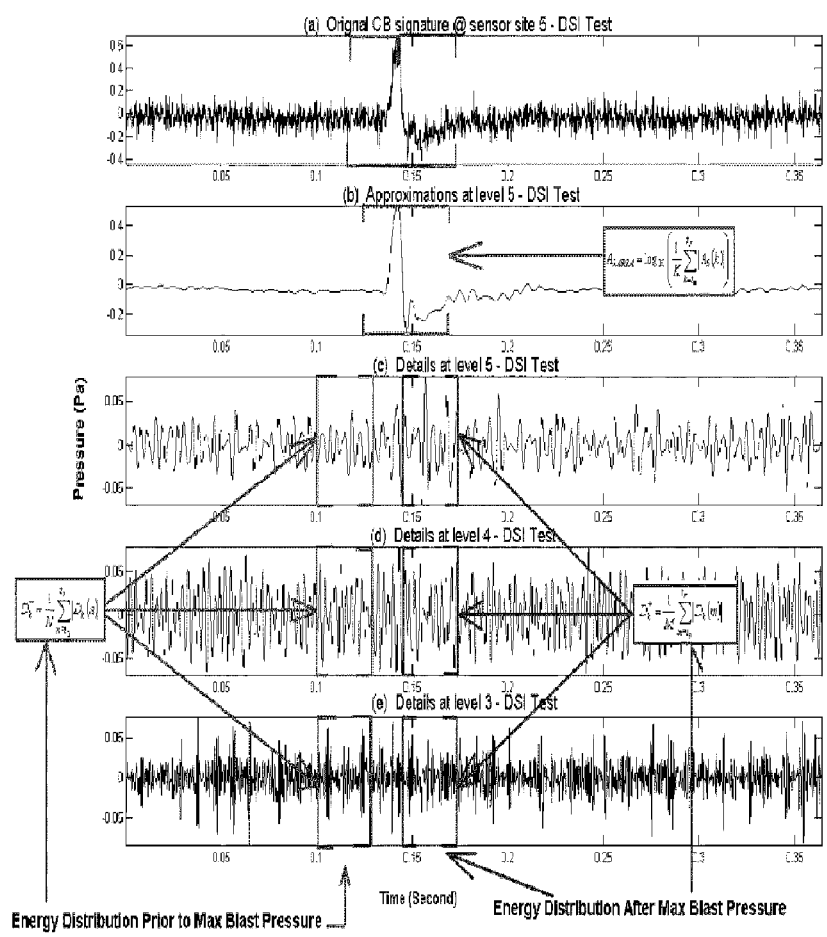
FIG. 5($a$-$b$) are graphs of acoustic signatures for a CB blast 6($a$) and a HE blast 6($b$) along with features extracted using DWT according to the present invention.
Figure 5B:
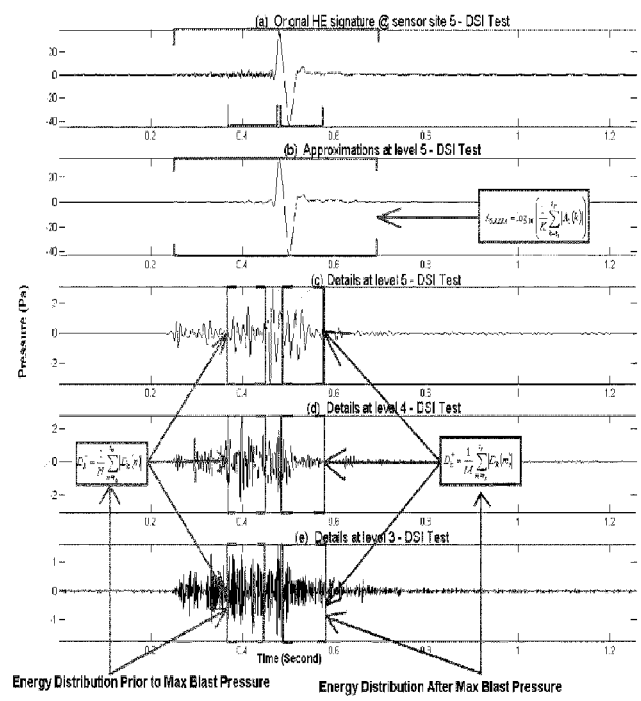
Figure 6A:
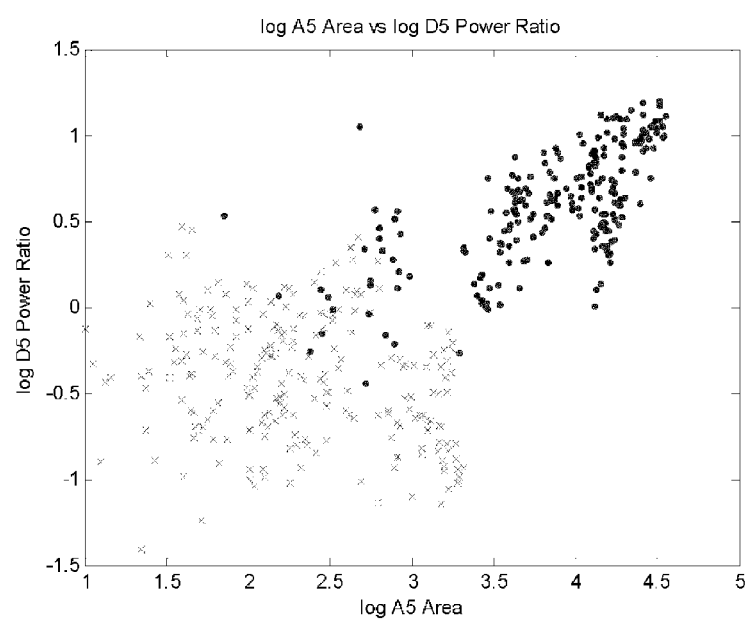
FIG. 6($a$-$f$) are scatter plots showing four permutations of 2-D subspaces for the set of DSI test data used to train and initially benchmark the performance of a neural network classifier.
Figure 6B:
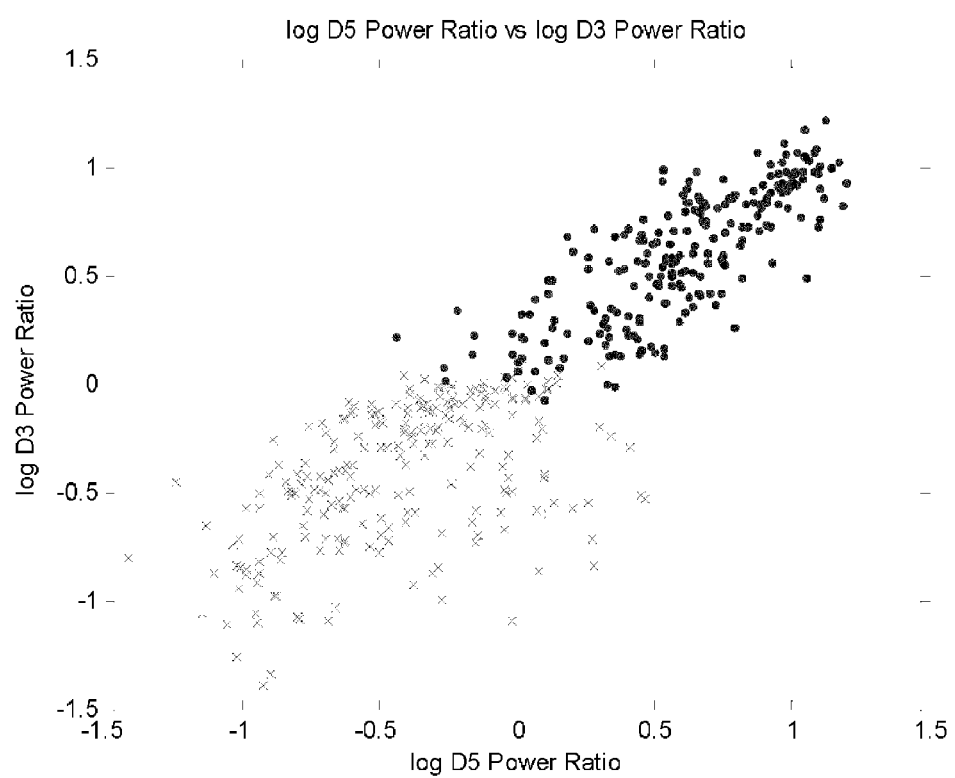
Figure 6C:
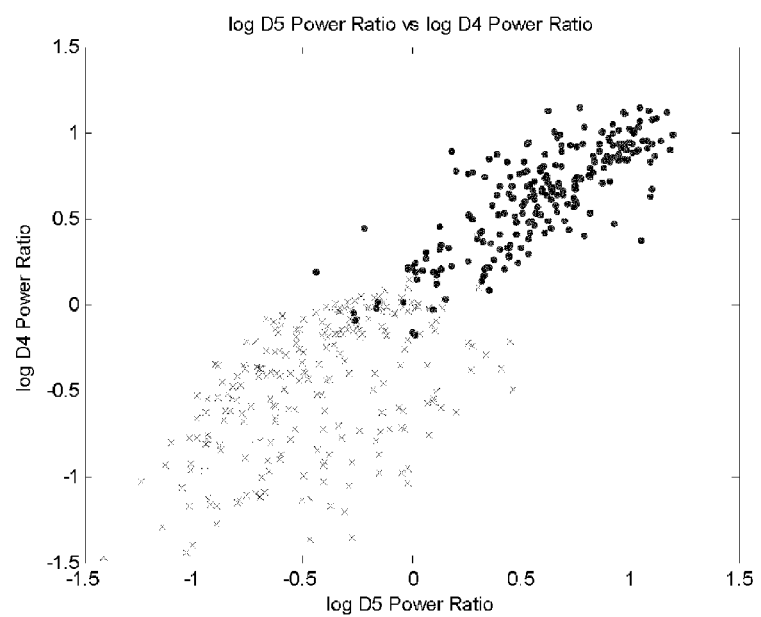
Figure 6D:
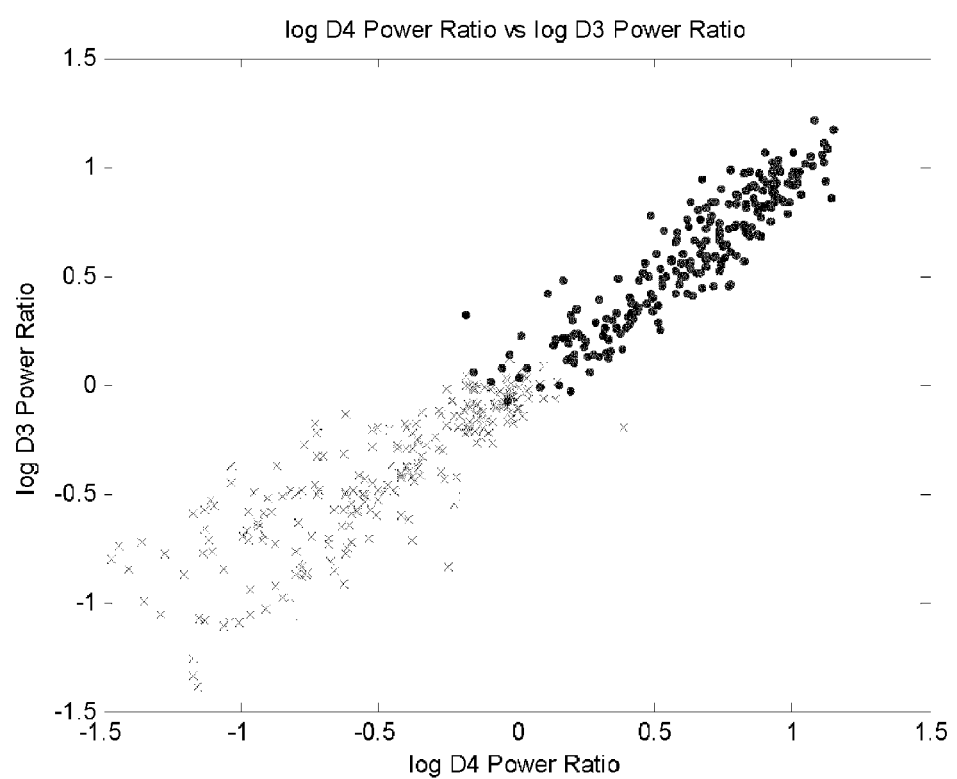
Figure 6E:
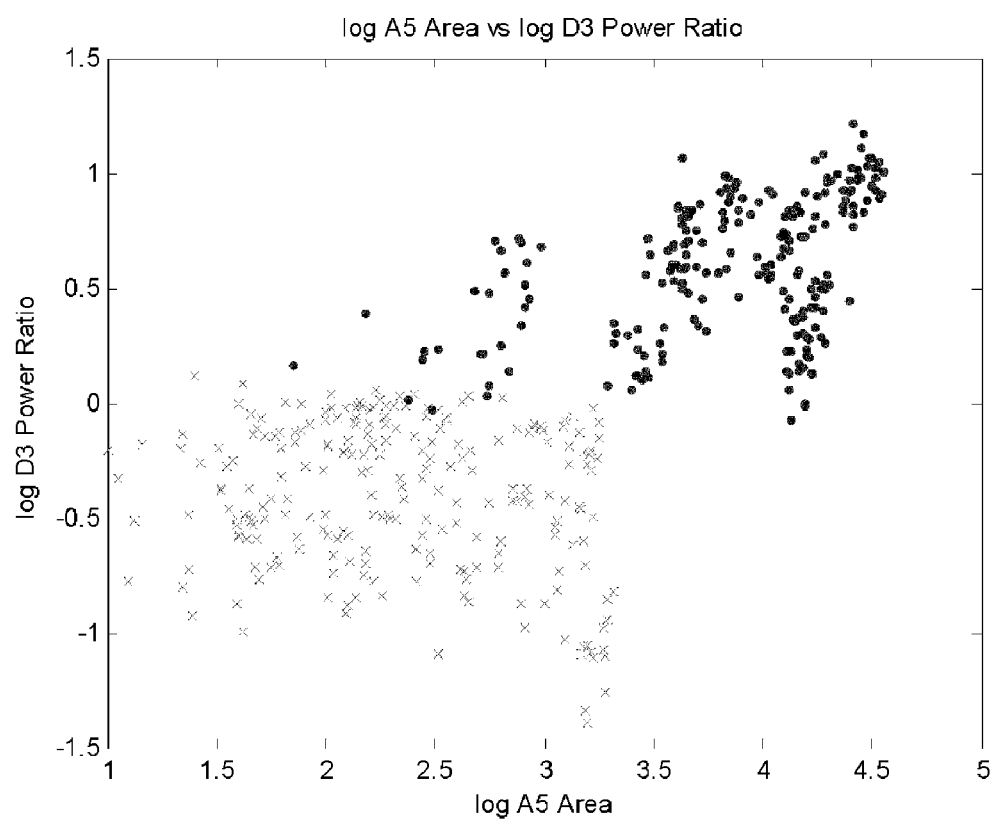
Figure 6F:
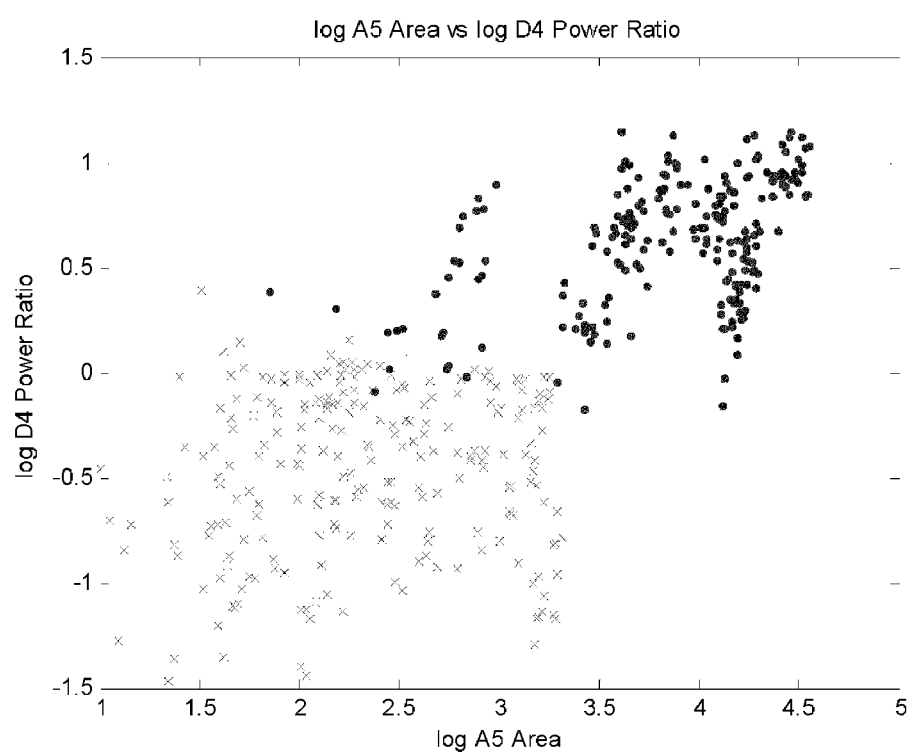

FIG. 5(a-b) show acoustic signatures for a CB blast 5(a) and a HE blast 5(b) along with features extracted using our inventive DWT method.

Now, if we let $t_p$ denote the sample time where the maximum peak over pressure of a blast wave occurs, and let $t_p = \alpha$, $\beta \leq 1$ for $t_p > t_0$ and $t_j > t_0$ such that $t_p$, $t_0$, $t_j \in 1$. We then define the energy distribution within the details just prior to the max peak pressure as:

$$D_k^- = \frac{1}{N} \sum_{n=t_0}^{t_P} |D_k(n)| \qquad (3)$$

Where $N = t_p - t_0$. We define the energy distribution at that point immediately after the max pressure as:

$$D_k^+ = \frac{1}{M} \sum_{m=t_P}^{t_F} |D_k(m)| \qquad (4)$$

Where $M = t_F - t_P$. Since evaluations of equations (3) and (4) > 0, we are able to define analytic features using the ratio of the normalized energy distributions within the details as:

$$x_{Dk} = \log_{10}\left(\frac{D_k^-}{D_k^+}\right) \qquad (5)$$

Note that the first 3-tuple of the features space consists of $x_{D5}$, $x_{D4}$, $x_{D3}$, which we believe are useful to characterize the explosive blasts of interest. A fourth feature is derived from the wavelet coefficient obtained at level 5. We integrate the magnitude of the area for the coefficients between the start and stop times defined for the details yields:

$$A_{5AREA} = \log_{10}\left(\frac{1}{K} \sum_{k=t_0}^{t_F} |A_5(k)|\right) \qquad (6)$$

FIG. 6(*a-f*) shows scatterplots of all of the permutations of 2-D subspaces for the set of DSI test data used to train and initially benchmark the performance of a neural network classifier. As used on those plots, an "x" is used to indicate features derived from a CB blast while the corresponding HE feature points are depicted with a ".". Note that the subspaces reveal a high degree of separability.

Neural Network Classifier

Turning now to a discussion of another important aspect of the present invention, we note that neural networks have become a powerful tool for solving difficult classification (mapping) problems with a proven ability to realize nonlinear discriminant functions and complex decision regions that are often required to ensure separability between classes. The use of neural networks for classification is well documented and requirements for training are well known and understood by those skilled in the art.

Figure 7:
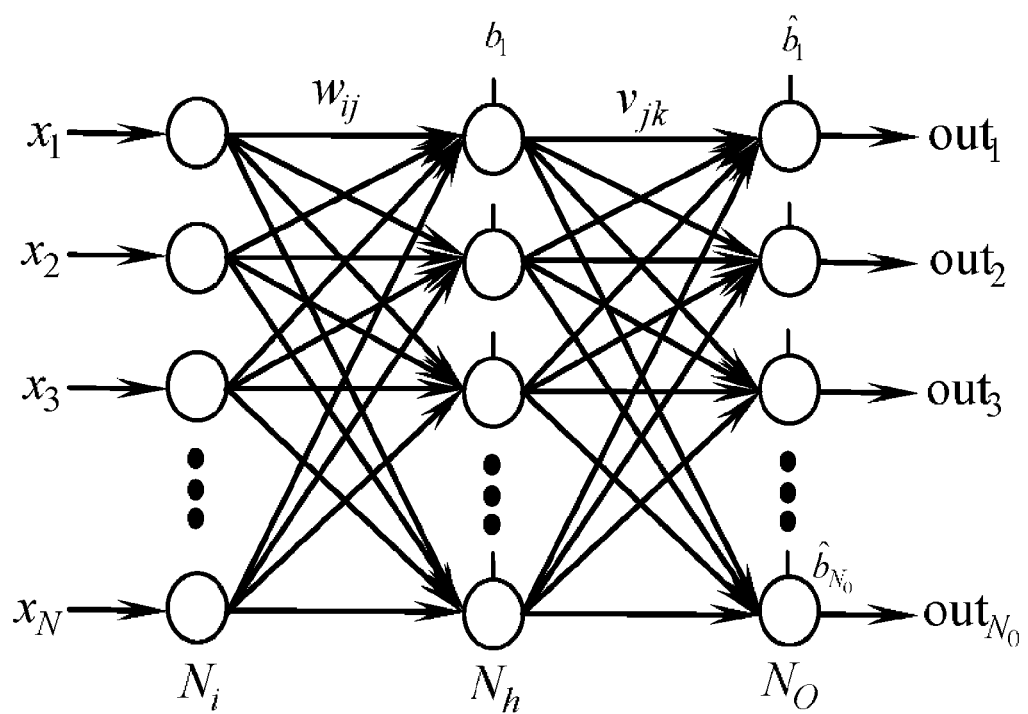
FIG. 7 is a diagram of a standard, multilayer feedforward neural network used in accordance with the present invention.

With reference to FIG. 7, there is shown a multilayer feedforward neural network that is used in conjunction with our inventive method to perform the instant invention. The neural network shown in FIG. 7 was chosen by us due to its ability to learn mappings of any complexity, provided that the number of hidden layer neurons is sufficient to accommodate the number of separable regions that are required to solve a particular classification problem.

Figure 8:
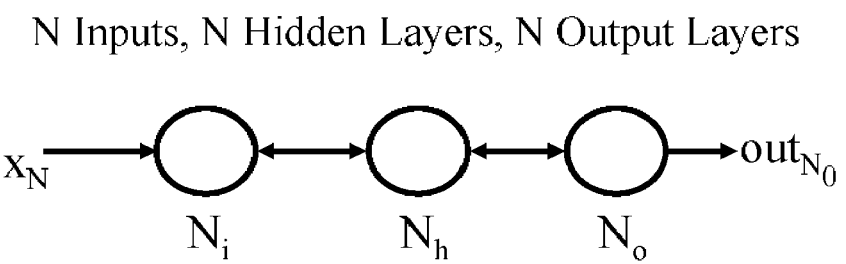
FIG. 8 is a diagram of the neural network used in accordance with the present invention having N inputs, N hidden layers and N output layers.
Figure 9:
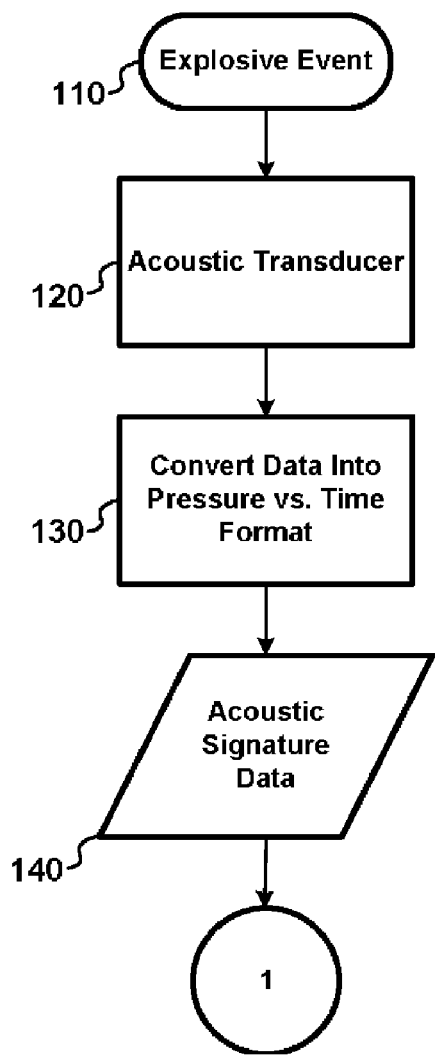
FIG. 9-FIG. 11 are flow charts depicting the steps involved with our inventive method.
Figure 10A:
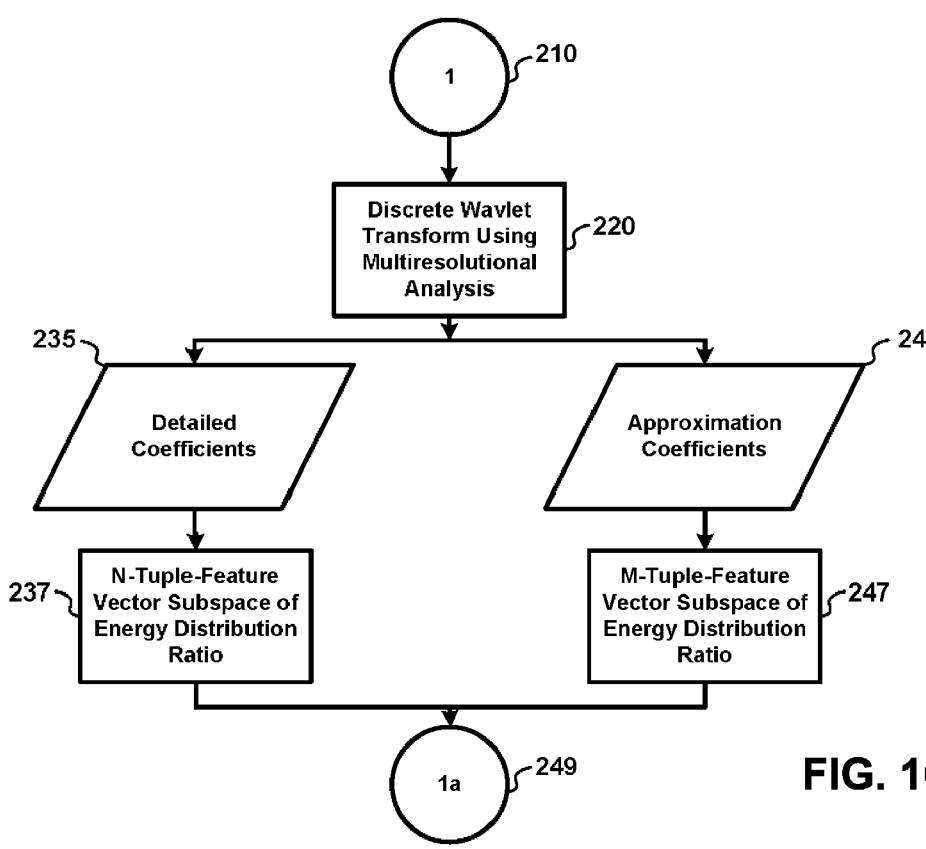
Figure 10B:
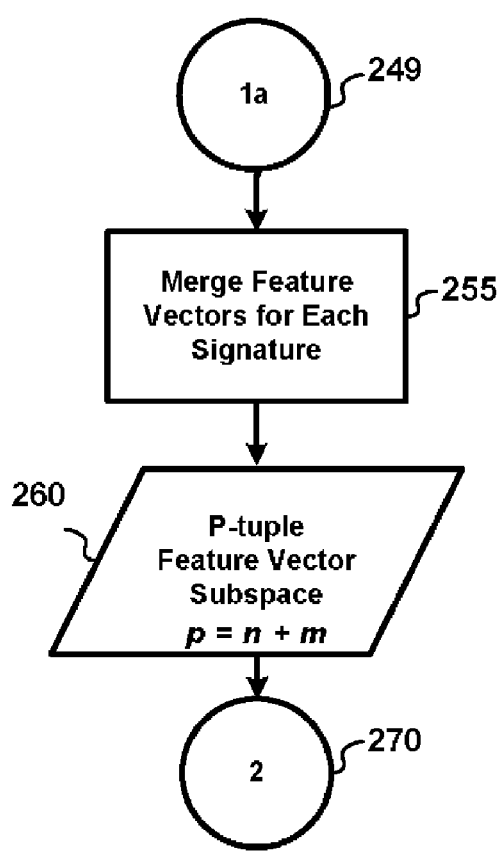
Figure 11A:
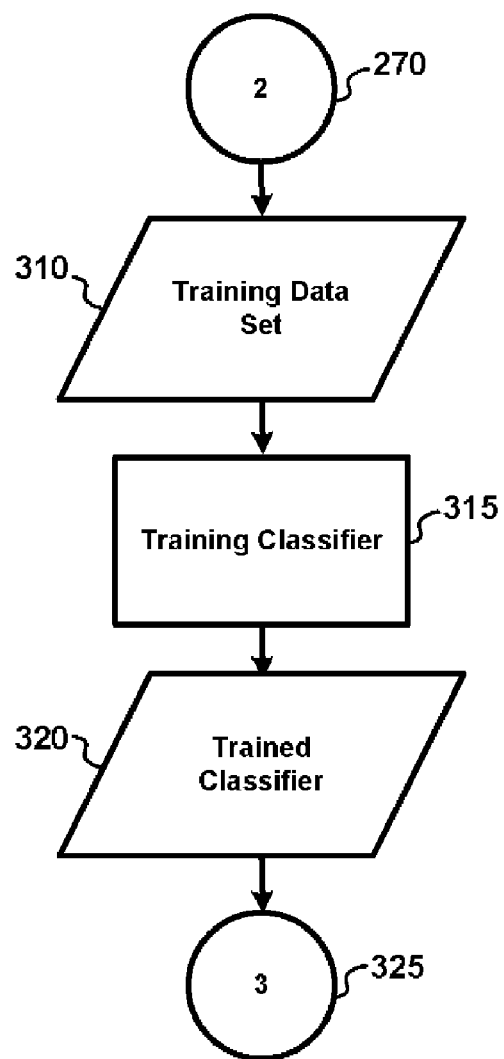
Figure 11B:
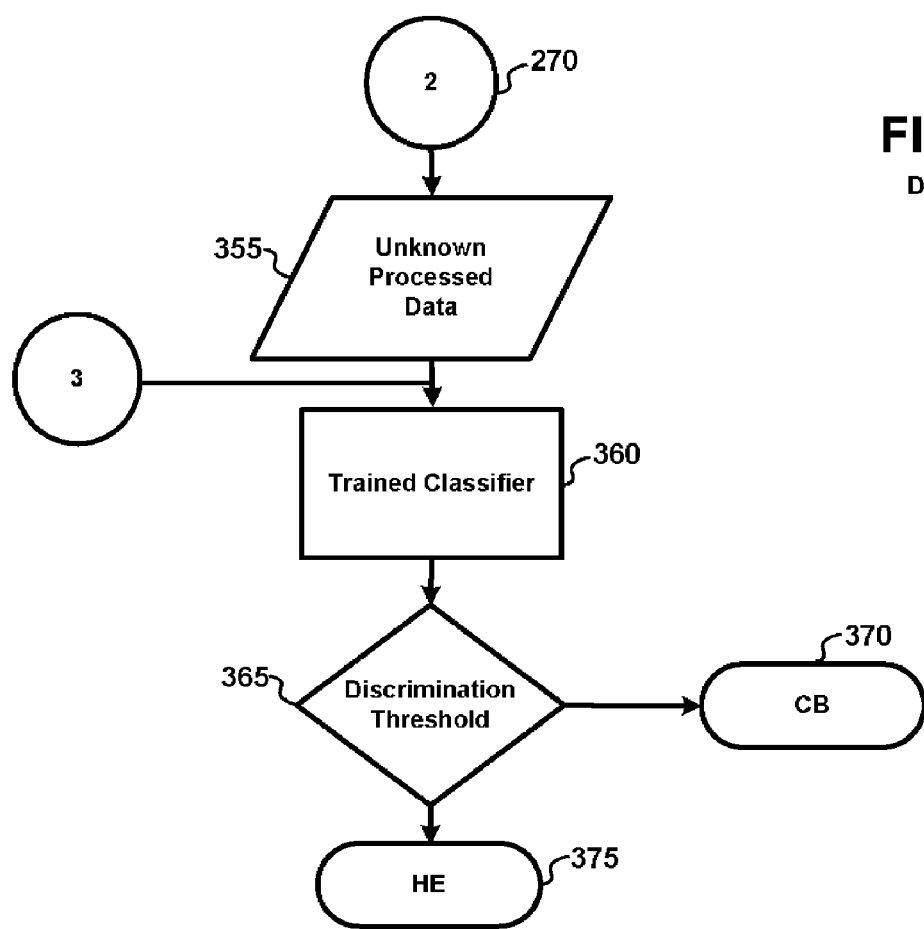

In general, the network contains $N_i$ inputs, $N_h$ hidden layer neurons and $N_O$ output layer neurons with no interconnections within a single layer as shown diagrammatically in FIG. 8. In the three-layer network shown in FIG. 7, the connection weight between the $i^{th}$ input and the $j^{th}$ hidden layer neuron will be denoted as $w_{ij}$ and $v_{ij}$ will be used to denote the connection weight between the $i^{th}$ neuron in the hidden layer and the kth output layer neuron. A bias for the $j^{th}$ hidden layer neuron is denoted as b and the bias for the $k^{th}$ output neuron is $b_k$. $x^P$ denotes the set of P, N-tuple feature vectors $X_n \in \mathfrak{R}^N_5$, $x^P = [x_1^P x_2^P, x_N^P]$ used to discriminate between the different classes of explosive events (artillery).

The input layer units or "neurons" propagate signals to the hidden layer but do not perform any computations. Neurons in the hidden layer and the output layer compute their response by taking a weighted sum signals from the previous layer plus a bias, and then passing the sum through an activation function.

For example, the output of the $j^{th}$ neuron in the hidden layer upon the presentation of the $p^{th}$ input pattern $x^P$ is given by $out_j^P = f(net_j^P)$ where $$net_j^P = \sum_{i=1}^{N} w_{ij} x_i^P + b_j,$$

and f is an activation function that was chosen to be the signed function:

$$f(net) = \frac{1}{1 + e^{-net}} \qquad (7)$$

The neural network classifier used to discriminate between High-Explosive and Chemical/Biological explosive blasts was trained using a generalized delta rule or back propagation algorithm. The algorithm sequentially adjusts the interconnection weights within the network, subsequent to the application of all patterns in a training set, a routine commonly referred to as an epoch.

In general, when an input pattern $x^P$ from a training set is presented to the network, it produces an output that is different from the target value, say $d^P$. The error for this specific pattern is defined as the squared error $$E_p = \frac{1}{2} \sum_{k=1}^{N_o} (d_K^P - out_k^P)^2.$$

An uncontested nonlinear optimization is performed to minimize total error function of the network:

$$E(w) = \sum_{k=1}^{P} E_P(w) \qquad (8)$$

Through the incremental computation of the gradient of the error in equation (8), and successive adjustment of the interconnection weights so as to achieve the global minimum error corresponding to $E_w = 0$.

Putting the Steps of Our Method Together

We may now describe a more specific set of steps which will permit our discrimination between types of explosive events. The flow charts we use for this purpose are meant to provide only an outline of the steps. And while we discuss our inventive method with respect to acoustic sensors detecting aerial disturbances, it should be explicitly understood that our method and algorithms would work equally well with ground-based seismic or underwater acoustic sensors.

With simultaneous reference to FIG. 9-FIG. 11(b), an explosive event (block 110) such as an artillery blast emits characteristic acoustics that are detected by an acoustic transducer (block 120) which records the characteristic acoustic signature information. Subsequently, the acoustic data is recorded into a format that is readily acceptable as a 1×n matrix, and is then put into pressure (Pa) vs. time to allow for comparable analysis (block 130).

This collected data may be compared with, for example, acoustic signature data of explosive events (block 140), This acoustic signature data is applied to a discrete wavelet transform (block 220) using a wavelet at level k, k$\in$l, whose attributes lend themselves to the analysis of our acoustic signature data with a single wavelet. As can be appreciated, the wavelet decomposition provides greater resolution of the baseband signal and the higher-level oscillatory harmonics associated with the acoustic signature for further analysis.

The primitives collected after the multiresolutional analysis is performed are the detailed coefficients from multiple k level, k$\in$l, decompositions representing the oscillatory harmonics of the acoustic signature data from the explosive blast that holds some unique traits of the blast (block 235). In addition, the primitives collected after the multiresolutional analysis is performed are the approximations coefficients from multiple k, k$\in$l, decompositions representing baseband information of the acoustic signature from the explosive blast providing distinctive information of the signature (block 245).

The oscillatory harmonics are the detailed components of the explosive blast wave derived from multiresolutional analysis at k levels, k$\in$l, of the signature. This information is a "picture" of the energy distribution of the signal at various resolutions. More specifically, the information just prior to the max pressure of the blast and immediately after the max pressure of the blast.

This information is summed into two elements prior to max pressure and after max pressure. The summed values are then associated with each other in the form of a ratio, with summation for prior to max pressure divided by the summation of the information just after the max pressure, the log of the ratio is taken and results in an n-tuple, n$\in$l feature space for each blast as we perform this calculation for each level of interest (block 237).

The $k^{th}$ level, k$\in$l baseband information is the approximation coefficients of the signal with a kth level, k$\in$l resolution. Integrating the area under the energy of the baseband from the start and stop times, which are defined by the detail coefficients for the signature and the log of the resulting value of the integration is taken and provides an output that gives distinct information of the signal resulting in a m-tuple, m$\in$l, feature space for each blast as we perform this calculation for each level of interest (block 247).

The n-tuple, n$\in$l feature space resulting from the detail coefficients is combined with the m-tuple, m$\in$l feature space resulting from the approximations (block 255) to form a single p-tuple, p=n+m feature vector subspace (block 260). The resulting processed signal information is stored for further analysis using a classifier.

Training data set (block 310) comprises taking p-tuple p=n+m, feature vector subspace from arbitrarily chosen acoustic signatures of explosive detonations to create a training data set of 50% HE blast events and 50% CB blast events creating a p×p, p=n+m, matrix of information to be used by the neural network.

Using a classifier—in this case a multi-layer, feedforward neural network—which takes in the primitive features extracted from acoustic signatures of the explosive blasts in the form of a p-tuple, p=n+m feature vector subspace describing the blast, a pre-determined desired output is also input as is the learning rate and number of hidden layers to train the neural network (blocks 315, 320).

At block 355, unknown processed data is defined as acoustic signature data of explosive events similar to the known training data. Applying the resulting weights from the training of the neural network results in a trained neural network (block 360). The unknown processed data is then tested against the trained neural network to produce an output for the sigmoid activation function. Applying a decision making process to the output of the trained classifier (block 365) results in a binary representation of an explosive event as either HE or CB allowing classification of the acoustic signature. The acoustic signature of the explosive blast is then determined to be either a HE in origin (block 375) or CB in origin (block 370)

As can now be appreciated and readily understood by those skilled in the art, our inventive method and algorithms may be summarized as follows. First, an arbitrary acoustic sensor/transducer detects an explosive event and records the data as a data structure with which subsequent processing may be performed.

Second, the data is processed in order to extract the predominant components of the unique characteristics and create a p-tuple feature vector space. Applying the discrete wavelet transform to the acoustic signature to perform wavelet decomposition, we produce a set of details and approximations at levels k, k$\in$l, by parsing the data through a series of filters providing multiresolution analysis of the signature thereby creating a set of primitives.

The primitives collected describe a ratio of energy distribution before and after max blast pressure of the high harmonic portion of the signature described by detail coefficients of the blast at levels k, k$\in$l. The other primitives used for the feature space are extracted from the approximation coefficients that integrates the area of the blast between start and stop times in the baseband. These elements together produce a p-tuple, p=n+m feature space that is stored as processed data that will be passed onto a classifier for further analysis.

Third, once the data is processed, the power of a multilayer feedforward neural network is used to process the characteristic feature space and classify the signature. The processed data has a set of p-tuple, p=n+m feature vector per signature. A set of these vectors are arbitrarily selected with no regard to the data and subsequently associated with a set of desired outputs between 0 and 1, where 0 is a high explosive blast and 1 is a chemical/biological blast. A sample set of p-tuple, p=n+m feature vectors are used to train the neural network and after training, a set of associated weights are produced.

Finally, with the classifier trained using a sample set of data, we apply random sets of vectors from the processed signature data sets classifying the data as either a high explosive event or a chemical/biological event. Advantageously—as a result of our inventive method—this discrimination comes with a high confidence.

EXEMPLARY RESULTS

In evaluating our inventive method, features were extracted from data sets using the DWT described previously and according to equations (5) and (6), we constructed a 4-tuple feature vector having the form:

$$x^P = [x_{D5}{}^P, x_{D4}{}^P, x_{D3}{}^P, A_{5AREA}{}^P] \quad (9)$$

Experiments were conducted to measure the separability of the feature space and benchmark the performance of the neural network classifier. The neural network architecture is shown schematically in FIG. 12.

Figure 12:
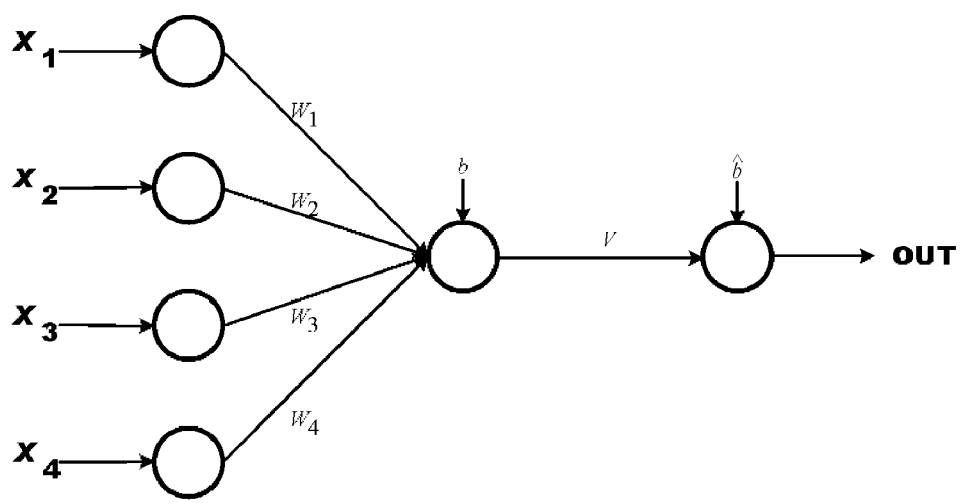
FIG. 12 is a schematic diagram of a neural network used to classify our experimental test data sets.

The neural network shown in that FIG. 12—having a single hidden layer neuron—was trained using 22 randomly selected vectors from a total of 461 signatures. The training set comprised 11 samples of Artillery Type A HE data and 11 samples of Artillery Type B CB data collected at several sensor sites. As can be appreciated, the goal of this training process was to obtain a neural network output equal to 0 when the sample features presented to the input layer corresponded to a HE explosive event and an output value of 1 when features from a CB explosive event are applied.

The network was trained such that the total error in Equation (8) was less than 5e−3 and a learning rate of 0.1 was used for the back propagation algorithm. When tested against the remaining 439 signatures, the network correctly classified 100% of the remaining 225 CB events and misclassified only 4 out of 214 (98.1%) of the remaining HE events. The resulting neural network classifier and resulting weights between layers are shown in FIG. 12.

In a subsequent experiment, a neural network having 4 hidden layer neurons was then trained using the entire data set from an earlier test. A total of 236 Artillery Type B CB and 225 Artillery Type A HE signatures. The network was then tested against the data subsequently collected.

The network correctly classified 165 of the total 166 CB events and misclassified only 6 out of 57 HE events for a rate of 99.4% and 89.5% respectively. Neural networks having up to 3 hidden layer neurons could not match or surpass the classification performance provided with our experimental architecture having 4 hidden layer neurons. However, the same results were obtained when training a neural network having 5 or more hidden layer neurons. Once again, the explosive events were classified as CB when the output from the sigmoid activation function (7) produced a value greater than 2 and HE, otherwise.

As we have now shown, feature extraction methods based on discrete wavelet transform and multiresolution analysis facilitates the development of a robust classification method that affords reliable discrimination between HE and CB explosive events via acoustic signals produced during detonation. In sharp contrast to prior attempts which have been based on amplitude dependent features—which vary dramatically due to signal attenuation and distortion—our inventive method is not dependent upon such features and still provides remarkably high confidence. In addition, our inventive method provides such a high confidence at ranges exceeding 1 Km from a blast site!

What is claimed is:

1. A method for discriminating between explosive events, said method comprising the steps of:
    acquiring data from an explosive event;
    extracting particular features from that event;
    training a classifier with the extracted features; and
    detecting, and subsequently acquiring, acoustic signature data from additional explosive event(s) using an arbitrary acoustic sensor/transducer situated a distance of at least 1 Km from the explosive event; and
    discriminating among the additional explosive events through the use of the trained classifier.

2. A method for determining a type of explosive event, said method comprising the steps of:
    detecting and subsequently acquiring acoustic signature data from training explosive event(s) using an arbitrary acoustic sensor/transducer;
    recording, the acquired acoustic signature data into a pre-determined data structure format;
    extracting, predominant features from the acoustic signature data stored in the pre-determined structure;
    training, a feedforward neural network with a set of feature vectors derived from the extracted features; and
    applying, random sets of vectors derived from acoustic signature data acquired from an explosive event to the trained, feedforward neural network;
    wherein said trained feedforward neural network produces a set of desired outputs between 0 and 1, with 0 representing a first type of explosive event and 1 representing a second type of explosive event; and
    wherein said arbitrary acoustic sensor/transducer is situated at a distance of at least 1 Km from the explosive event.

3. The method according to claim 1 wherein said data acquiring step comprises the steps of:
    detecting, with an acoustic transducer, acoustic signature information from the explosive event; and
    recording, the acoustic signature information.

4. The method according to claim 1 wherein said feature extraction step comprises the steps of:
    performing a discrete wavelet transform using multiresolutional analysis on the acoustic signature information;
    collecting a set of primitives comprising a set of detailed coefficients representing the oscillatory harmonics of the acoustic signature information;
    collecting a set of primitives comprising a set of approximations coefficients representing baseband information of the acoustic signature information; and
    combining, a feature space resulting from the approximations coefficients to form a single feature vector subspace.

5. The method according to claim 1 wherein said training step comprises the steps of:
    applying, a training data set comprising a feature vector subspace from arbitrarily chosen acoustic signatures to a multi-layer feedforward neural network; and
    applying resulting weights to the classifier.

6. The method according to claim 1 wherein said discriminating step comprises the steps of:
    collecting, unknown processed data representing acoustic signature information from the additional explosive event wherein said data has been processed in a manner substantially the same as data used to train the classifier;
    applying, a decision making process to the output of the trained classifier such that the output of the classifier is a binary output wherein one of said binary outputs represents a CB explosive event and the other binary output represents a HE explosive event.

7. The method according to claim 2 wherein said feature extraction step comprises the steps of:
    creating, a p-tuple feature vector space.

8. The method according claim 7 wherein said feature extraction step comprises the steps of:
    applying a discrete wavelet transform to the acoustic signature data such that a set of details and a set of approximations and a set of primitives are produced.

9. The method according to claim 8 further comprising the steps of:
    producing, a p-tuple, combined feature space by combining:
    primitives derived from detail coefficients of the explosive event; and
    primitives derived from the approximations coefficients of the explosive blast;
    wherein said primitives derived from the detail coefficients describe a ratio of energy distribution before and after max-blast pressure of the high harmonic portion of the acoustic signature and said primitives derived from the approximations coefficients that integrates the area of the blast between start and stop times in a baseband.

* * * * *

UNITED STATES PATENT AND TRADEMARK OFFICE
CERTIFICATE OF CORRECTION

| | |
|---|---|
| PATENT NO. | : 7,409,374 B1 |
| APPLICATION NO. | : 11/161903 |
| DATED | : August 5, 2008 |
| INVENTOR(S) | : Hohil et al. |

It is certified that error appears in the above-identified patent and that said Letters Patent is hereby corrected as shown below:

On the cover page, item [75] under INVENTORS, "Sashi" should read --Sachi--.

Signed and Sealed this

Sixteenth Day of September, 2008

JON W. DUDAS
*Director of the United States Patent and Trademark Office*